United States Patent [19]
Laulhe et al.

[11] Patent Number: 6,022,000
[45] Date of Patent: Feb. 8, 2000

[54] VALVE DEVICE

[75] Inventors: René Laulhe, D'Ornon; Patrick Guiroy, Cestas; Jean-Claude Garrigues, Cadaujac; Jean-Paul Dubois, Contras; Claude Wattignier, Talence, all of France

[73] Assignee: KSB Aktiengesellschaft, Germany

[21] Appl. No.: 08/930,255

[22] PCT Filed: Feb. 29, 1996

[86] PCT No.: PCT/EP96/00820

§ 371 Date: Jan. 26, 1998

§ 102(e) Date: Jan. 26, 1998

[87] PCT Pub. No.: WO96/28680

PCT Pub. Date: Sep. 19, 1996

[30] Foreign Application Priority Data

Mar. 14, 1995 [EP] European Pat. Off. .............. 95103653

[51] Int. Cl.$^7$ ...................................................... F16K 1/22
[52] U.S. Cl. .......................................... 251/306; 251/214
[58] Field of Search ..................... 251/214, 305, 251/306

[56] References Cited

U.S. PATENT DOCUMENTS 4,759,530 7/1988 Iff ............................................ 251/306

FOREIGN PATENT DOCUMENTS

| 0023953 | 2/1981 | European Pat. Off. . |
| 2325867 | 4/1977 | France . |
| 2460182 | 7/1975 | Germany . |
| 1354260 | 6/1974 | United Kingdom . |

OTHER PUBLICATIONS

Gebrauchmuster DE, U, 90 04610 Pfannenschmidt Sep. 20, 1990.

Primary Examiner—John Fox
Attorney, Agent, or Firm—Knobbe, Martens, Olson & Bear, LLP

[57] ABSTRACT

A valve device comprising a body (1), a closure member (2) operated by a shaft (3) guided through a neck (4) in the body (1), and a liner (5) provided with a flange (6) extending along part of the length of the neck (4). The sealing contact between the shaft and the bore may be improved by means of a clamping assembly (7, 8, 9) positioned around the flange (6) in a space (10) in the body (1). The size of the clamping assembly (7, 8, 9) is such that it exerts a force on the flange (6) and thereby on the shaft (3). The clamping assembly (7, 8, 9) is radially and/or tiltably movable in said space (10) relative to the body (1). Said device is particularly suitable for butterfly valves for use with corrosive and/or delicate liquids such as liquid chemicals and liquid foodstuffs.

4 Claims, 9 Drawing Sheets

VALVE DEVICE

TECHNICAL FIELD

The invention relates to a valve device, particularly a valve for corrosive and/or delicate liquids, such as liquid chemicals and liquid foods. The valve device comprises a body, a shutter operated by a shaft guided in a neck of the body and a sealing sleeve fitted with a collar which extends over a certain length along the neck.

When a valve of this kind is installed on pipework carrying a pressurised fluid, it must not constitute a weak point and it must ensure the continuity of the enclosure formed by the pipe in relation to the pressurised fluid. No leaks to the outside are permissible, either at the connection to the upstream and downstream pipes or at the passages for the shafts which operate and guide the shutter.

The sleeve enveloping the body provides all the seals needed for the valve: the upstream-downstream seal, the seal at the junctions with the pipework and the seal around the shaft passages. To ensure the upstream-downstream seal at the shutter, but also at the bearing surface for the shaft passage, the sleeve may comprise resilient means which serve to create the necessary pressure. In the case of an elastomeric sealing sleeve, the resilient means consist of the sleeve and collar themselves. In the case of a sleeve made of plastomer, a flexible cushion placed between the body and the sleeve constitutes the resilient means.

To reinforce the seal of the enclosure, a second seal may be provided, operating as a stuffing-box around the shaft.

STATE OF THE ART

In the case of elastomer sleeves the sealing of the shaft passages is achieved by compression of the collar of the sleeve surrounding the shaft between the body, the shaft and the shutter. Apart from the fact that this is a dynamic seal, the parameters which determine the compression of the elastomer for a given level of seal are subject to variations depending on the operating conditions of the tap, particularly pressure variations.

In patent application DE-A-24 60 182, there is a description of a butterfly valve in which the butterfly rotates about a shaft passing through an annular seating, the U-shaped section of which surmounts the inside and flanks of the valve body. This butterfly valve comprises, on the one hand, a first seal on the bearing surface of the shaft passage, provided by a compressed flexible cushion, and on the other hand, around the part of the shaft which passes through, a sealing washer held tight by resilient means, e.g. a compression spring, between the bearing of the shaft and the seating. This second seal is a back-up seal in case the first seal fails.

The publication DE-C-20 27 775 discloses a butterfly valve wherein the sealing sleeve is fitted with a collar extending along the shaft. This collar is sealed by means of a stuffing-box placed between the collar and the neck of the tap body, this assembly forming the second seal, whilst the first seal is provided at the bearing surface for the shaft passage.

The publication EP-A-0 411 652 discloses a valve with a spherical bushing fitted with a second sealing system made up of an elastomeric torus accommodated in a ring in a plain bearing guided in the body. These types of construction have the drawback that the seal of the shaft depends on deformations of the shaft or variations in temperature. In the closed position, the shutter is subjected to the differential pressure between upstream and downstream. This differential pressure creates a radial force on the shaft and the shaft has a tendency to move radially downstream. The movement results, on the one hand, from the take-up of the guidance play of the shaft in the bearing of the body and the fitting play between the shaft and the shutter, and, on the other hand, from the deformation of the shaft and the shutter under the effect of the load caused by the pressure on one side of the shutter.

Deformation of the parts under the effect of the loads is inevitable. The play between the shaft and the collar increases on the upstream side and the components of the first seal are unloaded on the upstream side and loaded on the downstream side. The fluid upstream-is now able to rise, passing through the first seal until it reaches any second seal provided, such as the first lining comprising the stuffing-box.

For an elastomer sleeve the designers have constantly sought to overcome this disadvantage by devices such as auxiliary joints, special shapes and reinforcing inserts. This list is not exhaustive. Even though such devices may improve the results they do not solve the problem completely because they do not totally do away with the imbalance, under the effect of deformation, in the contact pressures around the shaft passage.

Similarly, to ensure that the second seal of a plastomer sleeve, in this case the stuffing-box, does not give way, it is necessary to exert pressure on the flange such that the pressure modified by the shaft deformations remains greater than that of the fluid. With the increase in pressure in the stuffing-box, the operating forces also increase. This makes it essential to use a device with a compensation spring, which is bulky and expensive.

The aim of the invention is to find an economically advantageous solution to ensure the sealing of the shaft more reliably without increasing the operating force.

DESCRIPTION OF THE INVENTION

The object of the invention proposed has a new concept which makes it possible to maintain an evenly distributed contact pressure between the sleeve and the shaft, irrespective of the differential pressure applied to the shutter and hence regardless of the deformation of the shaft-shutter assembly.

According to a first feature, a clamping device is positioned around the collar in a space in the body. The clamping device is of such dimensions that it exerts a force on the collar and hence on the shaft. The clamping device is mounted in the space with radial and/or oscillating freedom of movement relative to the body.

The fact that it is mounted so as to float in the body space enables the clamping device to follow the movements of the shaft under the effect of the deformations caused by the pressure or temperature at the shutter. This freedom of movement ensures that the contact pressure for the seal is not modified in any way and the latter is perfectly reliable and durable, no matter what the operating pressure inside the valve device. The radial pressure between the shaft and the sleeve creates a leaktight barrier without using an auxiliary material or torus and this compensation is totally independent of the movement of the shaft and shutter.

Another embodiment envisages a covering for the shutter, the shutter extending beyond the clamping point along the shaft in the neck.

It is possible to ensure a leaktight seal even if the sleeve and the covering of the shutter are made of plastomer. In this case, a flexible cushion is placed between the body and the sleeve. In another embodiment the clamping device comprises a resilient torus housed in a reaction ring and pressed against the collar by this reaction ring. The reaction ring is floatingly mounted in the neck and follows the movements of the shaft without altering the contact pressure needed to ensure a seal. It is possible to provide radial and axial freedom of movement at the same time.

Preferably, the reaction ring is fitted with a conical part which allows the resilient torus to be prestressed and a cylindrical part acting as the seating for the resilient torus. This avoids damage during the positioning process and provides sufficient prestressing to ensure a tight seal.

To improve operation, the clamping device additionally comprises a support ring on which the resilient torus rests. The radial dimensions of the support ring are such that it can also follow any radial movements of the shaft.

Another embodiment is the arrangement of the space in the neck close to the shutter around the collar. The clamping device is located in the immediate vicinity of the first seal and should be mounted from inside the body.

Preferably, the clamping device comprises a metal spring with a helical winding. In another embodiment the flexible cushion comprises a rigid washer which limits the axial movement. In yet another embodiment the sleeve comprises a ring which ensures radial compression of a resilient collar of the cushion or the collar of an elastomer sleeve.

According to another embodiment the clamping device consists of a cage enveloping the collar against the space, the neck and partly the shaft side. The cage may extend radially towards flanges between the sleeve and the body. This cage radially follows the movement imposed by the deformation of the shaft under the effect of the differential pressure exerted on the butterfly. This results in a significant improvement in performance. With the clamping device consisting of a swivel bearing guiding the shaft and at the same time allowing a rocking movement consisting of a radial and axial movement, it may easily be imagined that the deformation of the butterfly valve and the shaft under the effect of the differential pressure applied to the butterfly valve will cause the guide bearing to rock in its pivot and the distribution of the compression of the collar of the sleeve will not be affected either in its level or in its distribution, no matter what the differential pressure of the fluid carried by the valve. The outward seal around the shaft passage is thus rendered perfectly safe and reliable.

In another embodiment the swivel bearing bears only on at least one relatively small spherical strip, which makes it possible to keep the construction economical.

In order to achieve great precision, the swivel bearing is housed in a recess arranged in the neck.

The housing of the swivelling collar maintains an even distribution of the contact pressure around the shaft passage, independently of the deformation of the shaft and the butterfly valve.

DESCRIPTION OF THE VARIOUS FIGURES

The accompanying drawings illustrate the invention embodied in a butterfly valve having a plastomer sleeve.

EMBODIMENTS

Figure 1A:
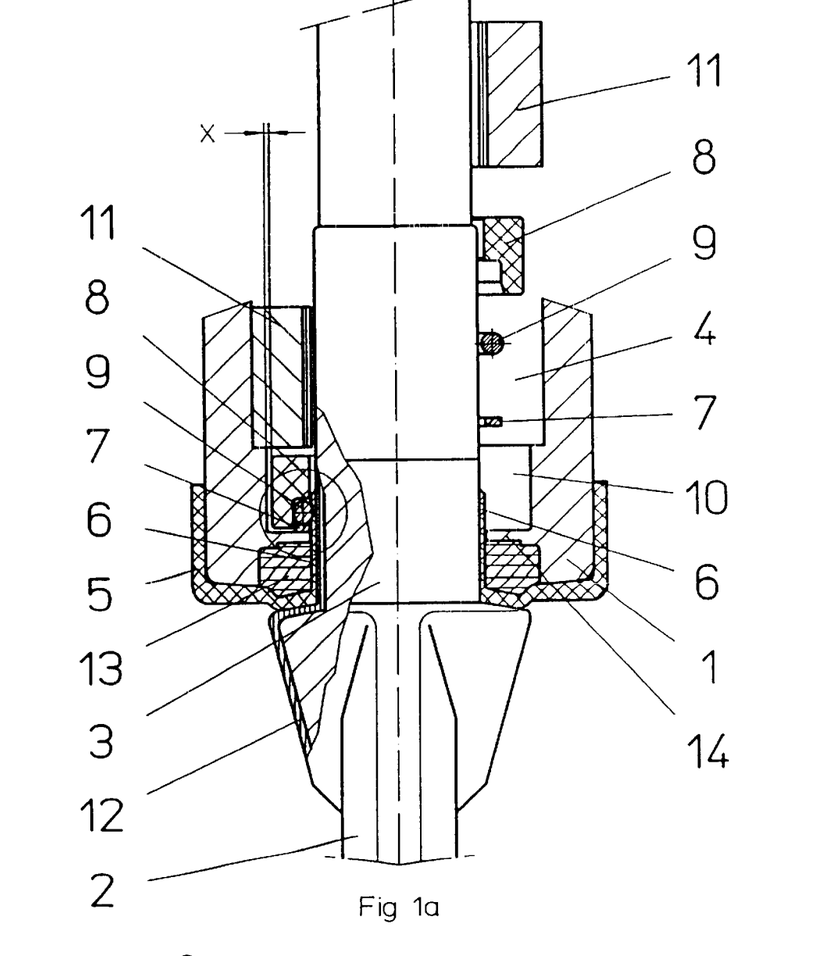
FIG. 1a shows, in partial section, on the lefthand side, the shaft passage of a butterfly valve having a sleeve and a shutter coated with plastomer, after being installed in position and, on the right hand side, during positioning.

A valve device according to the invention, shown in FIG. 1a, comprises a body 1 and a shutter 2 manipulated by a shaft 3 guided in a neck 4 of the body 1.

The seal between the body 1 and the shaft 3 is provided by a sealing sleeve 5 provided with a collar 6 which extends over a certain length along the neck 4 between the neck and the shaft 3. At a certain distance from the start of the collar 6 it is relatively thin, allowing radial forces to be transmitted.

Around the collar 6 is positioned a clamping device 7, 8, 9 in a space 10 in the neck 4 of the body 1. The clamping device 7, 8, 9 comprises an axial support ring 7, a radial reaction ring 8 and a resilient torus 9. The reaction ring 8 is located in the space 10 and is of such dimensions that it is movable between the shaft 3 and the body 1.

Figure 1B:
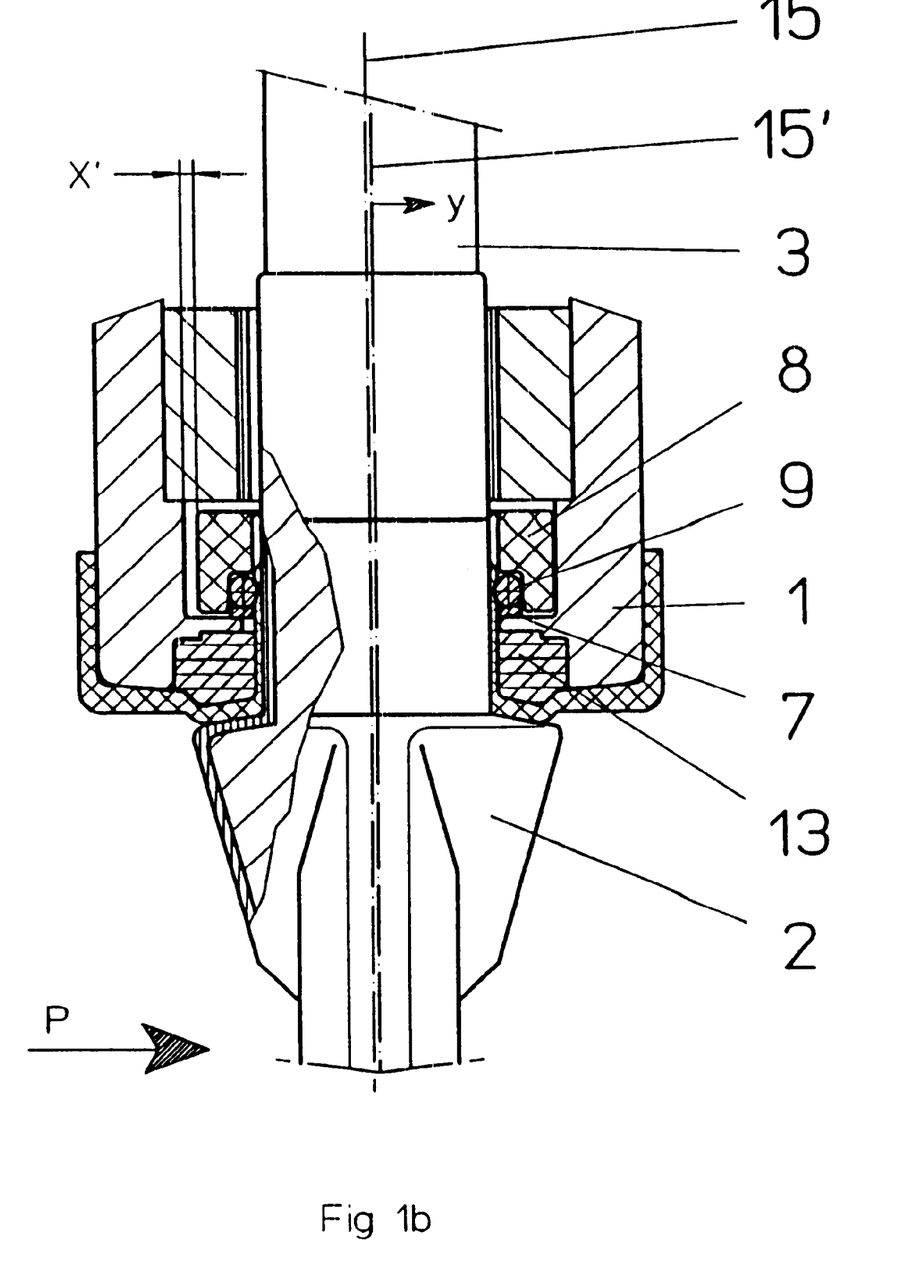
FIG. 1b shows the valve in FIG. 1a subjected to a pressure P.
Figure 2:
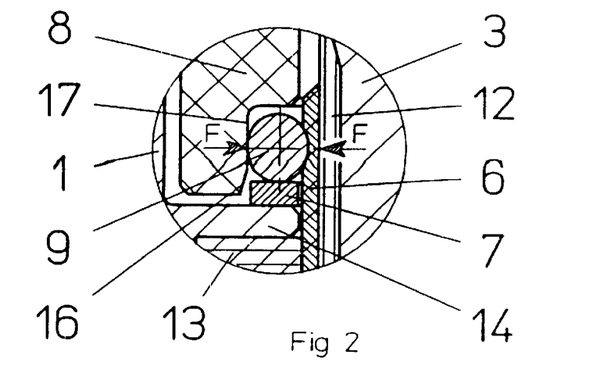
FIG. 2 shows an enlarged detail of FIG. 1.

In FIG. 2, which is an enlarged detail from FIG. 1, the components of the clamping device 7, 8, 9 are shown in their initial state. The resilient torus 9 is housed in the reaction ring 8 in such a way that, on its side facing the shaft 3, it exerts a force F on the collar 6 and consequently on the shaft 3. Its side facing the body abuts on the reaction ring 8.

The force F is created by the prestressing of the ring 8 on the torus 9 during the assembly of the clamping device 7, 8, 9. To prevent the torus 9 giving way under load in the axial direction, it abuts axially on one side on the support ring 7 and is housed on the other side in the L-shaped reaction ring 8.

The reaction ring 8 is floatingly mounted in the space 10 with axial and radial freedom of movement relative to the neck 4. The radial play is indicated by X. The axial movement is, however, limited by a retaining member 11 fixed in the neck 4. This retaining member 11 also acts as a radial bearing for the shaft 3.

The butterfly valve shown by way of example comprises a shutter 2 with a covering 12 of plastomer such as PTFE (Teflon®) which extends along the shaft 3 in the neck 4, and a sleeve 5 made of plastomer such as PTFE (Teflon®) with a collar 6 and a flexible cushion 13.

The seal between the shutter 2 and the neck 4 is achieved by two means. Firstly, there is a seal at the point where the shaft 3 enters the body 1. As the plastomer sleeve does not have sufficient elasticity, an elastomer cushion 13 is provided between the body 1 and the sleeve 5 to create prestressing between the sleeve 5 and the covering of the shutter in order to ensure an upstream/downstream seal and provide the first level of sealing around the shaft 3. After this first seal there is the back-up seal provided by the clamping device 7, 8, 9.

The clamping device 7, 8, 9 is put into position as shown in FIG. 1a, right-hand side. Once the shutter 2 with the shaft 3 have been inserted in the body 1 and the neck 4, the support ring 7 is threaded onto the shaft 3 and moved down towards the shutter 2. After passing over the end of the collar 6 it arrives in the space 10, where it is retained by a shoulder 14 of the body 1.

Then the undeformed resilient torus 9 is threaded onto the shaft 3 and moved down towards the shutter 2. After passing over the end of the collar 6 it arrives in position on the support ring 7. Then the reaction ring 8 is put into position. Moving down, the ring 8 passes the torus 9 and takes up a position with its conical part 16 between the torus 9 and the body 1. As it moves the ring 8 further down, the torus 9 is clamped radially between the collar 6, which bears on the shaft 3, and the ring 8. This causes resilient deformation of the torus 9 which has entered the cylindrical part 17 of the reaction ring 8 and thus creates a sealing force F, which ensures a leaktight seal between the shaft 3 and the collar 6. Finally, a retaining member 11 is mounted so as to limit the axial movement of the clamping device 7,8,9.

FIG. 1*b* shows the state of the valve device under pressure P. As a result of the pressure, a force is exerted on the shutter, causing a shift Y in the axis 15 towards 15' and causing bending of the shutter 2 and the shaft 3 in the direction of the force created by the pressure P. The seal at the point of entry of the shaft 3 is weakened, as the shaft 3 has moved away from the body 1 on the upstream side and consequently the prestressing of the elastomer cushion 13 has decreased. This is shown by an increased clearance X' resulting from this shift.

In order to maintain the total sealing of the device, the second seal is ensured by means of the radially movable clamping device 7,8,9. The clamping device 7,8,9 follows the movement of the shaft 3 in the radial direction without modifying the contact pressure F needed for leaktightness.

Figure 3:
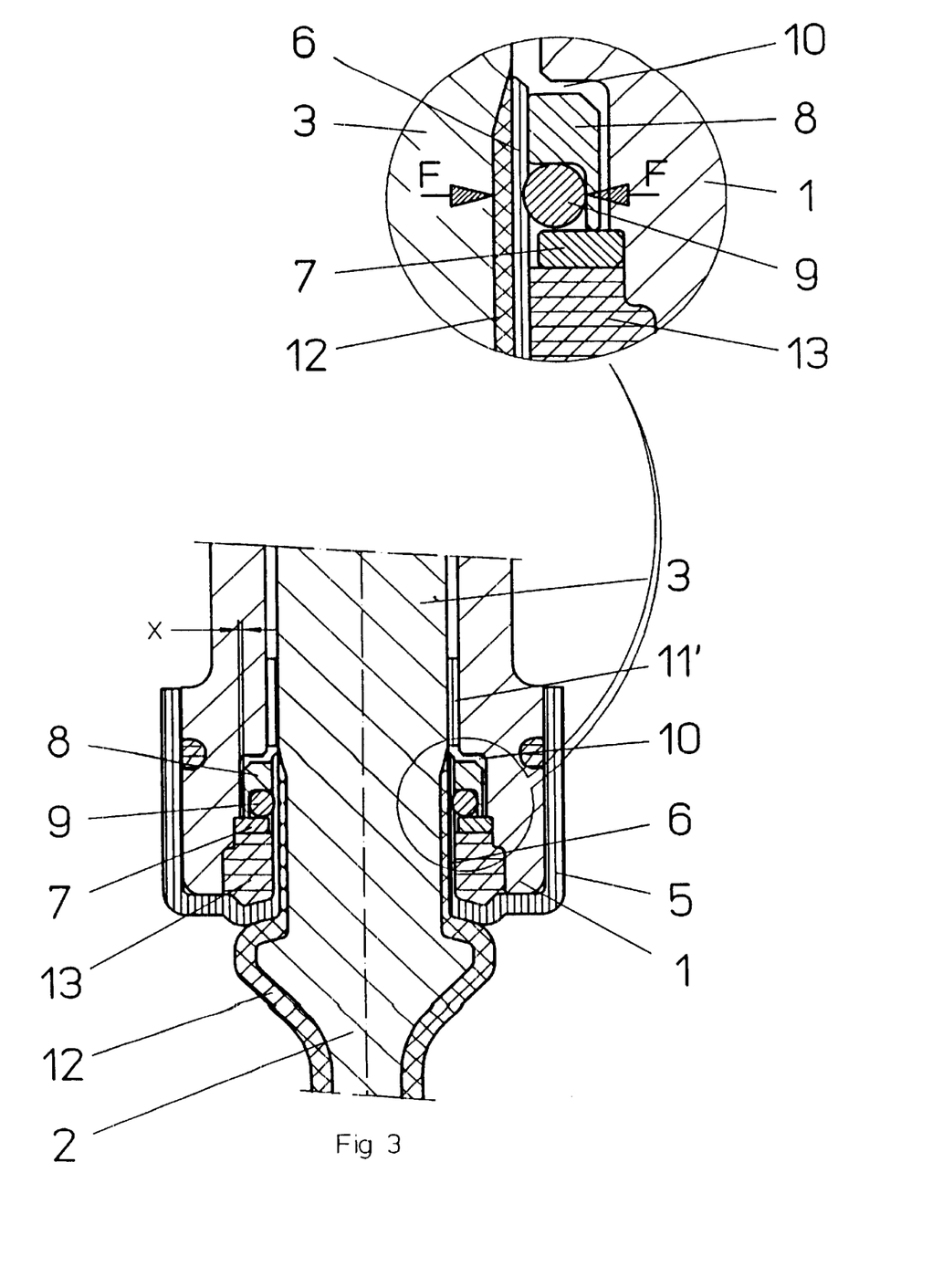
FIG. 3 shows, in partial section, the shaft passage of a butterfly valve with a sealing system to be mounted from inside the body.

FIG. 3 shows a butterfly valve with a sealing system to be mounted from inside the body 1. The same components are used again, in principle, but instead of a retaining member 11 as the abutment and bearing for the shaft, there is a body of a suitable shape and an additional bearing 11'.

Figure 4:
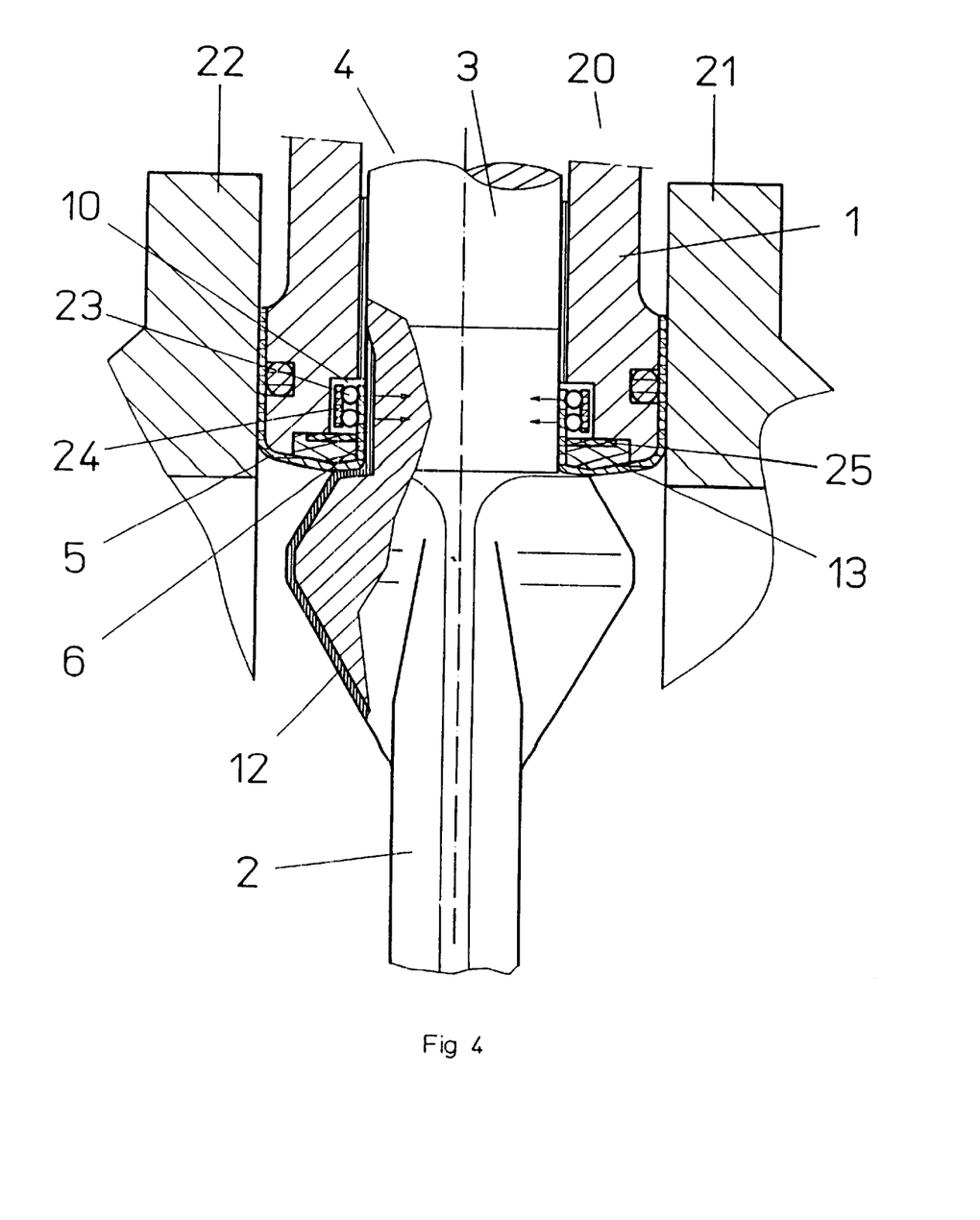
FIGS. 4 and 5 show other embodiments of an assembly from inside the body.
Figure 5:
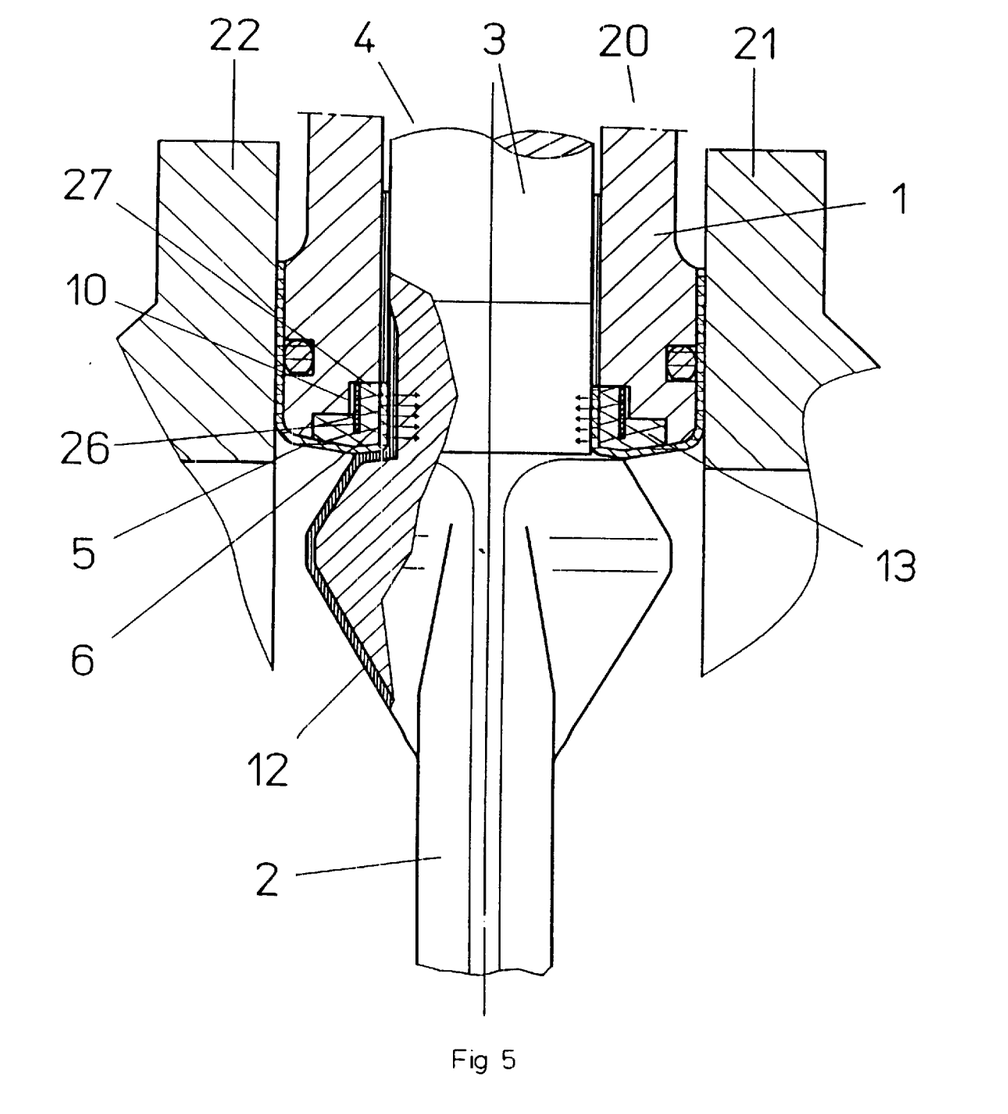

FIGS. 4 and 5 show a butterfly valve with an integral sealing system. The two seals are arranged in the minimum space.

FIG. 4 shows a butterfly valve 20 mounted between two flanges 21, 22. It comprises a shutter 2 covered with a covering 12 which extends upwards along a shaft 3 in a neck 4 of a body 1. A sleeve 5 provides a seal with the flanges 21, 22 and the shaft 3. In order to do this, it is fitted with a collar 6 extending upwards in the neck 4 of the body 1. As the sleeve 5 is made of plastomer, a flexible cushion 13 is provided to ensure a leaktight seal at the entrance. Along the neck 4 and between the body 1 and the collar 6 is a space in which is located a clamping device 23, 24. To prevent the cushion 13 from escaping into the space 10, a rigid washer 25 is associated with the cushion 13 and oriented toward the space 10, acting as an abutment for the cushion 13.

The clamping device 23, 24 consists of two helically wound metal springs 23 and a ring 24. The springs 23 exert a force indicated by the arrows on the collar 6, creating as many leaktight barriers. The clamping device 23, 24 is mounted so as to float radially and axially in the space 10, whilst the cushion 13 is fixed.

In FIG. 5, the clamping device consists of a rigid ring 26 attached to the cushion 13 and extending along the shaft 3. The cushion 13 comprises a collar 27 oriented towards the neck 4 and parallel to the collar 6 of the sleeve 5. The ring 26 holds the collar 27 compressed after it has been put into position.

The positioning of the clamping device 23, 24; 26 according to FIGS. 4 and 5 in the neck 4 is carried out from the shutter 2 side. In the case of FIG. 4, the cushion 13 and the clamping device 23, 24 are inserted in the body 1. In the case of FIG. 5, only the cushion 13 must be inserted. Then the sleeve 5 with the shutter 2 and the shaft 3 mounted is supported in the neck 4.

During assembly, prestressing is created in the springs 23, and in the collar 27, respectively, by the clamping of the springs 23 and the collar 27 between the collar 6 and the rings 24;26 and is maintained by the rings 24;26.

Figure 6:
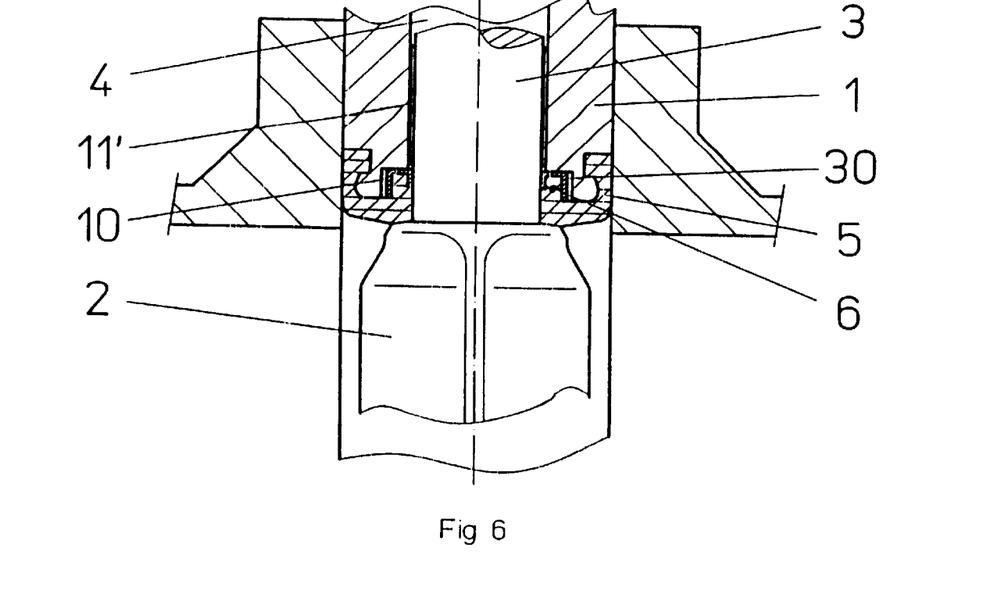
FIGS. 6 and 7 show a butterfly valve having a sleeve of elastomer and a cage for transmitting the radial movements of the shaft to the collar of the sleeve.
Figure 7:
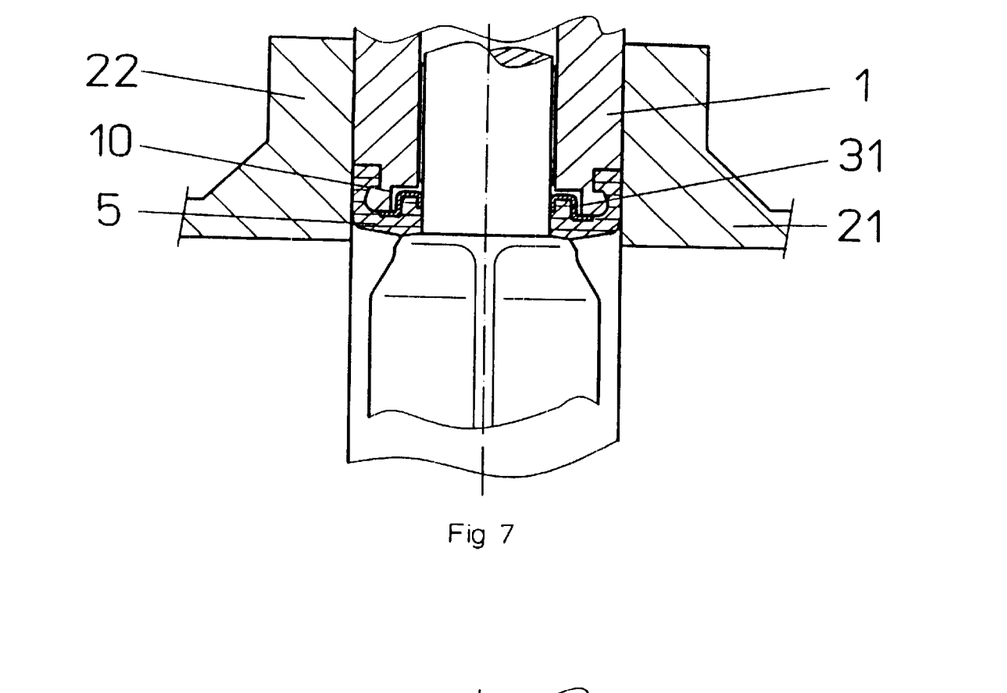

FIGS. 6 and 7 show a butterfly valve with an elastomer sleeve 5 and a cage 30;31 transmitting the radial movements of the shaft to the collar 6 of the sleeve 5. The cage 30; 31 envelopes the collar 6 against the space 10, the neck 4 and partly on the shaft side 3. To limit the axial displacement of the collar 6, the cage 31 extends radially towards flanges 21, 22 between the sleeve S and the body 1.

Figure 8:
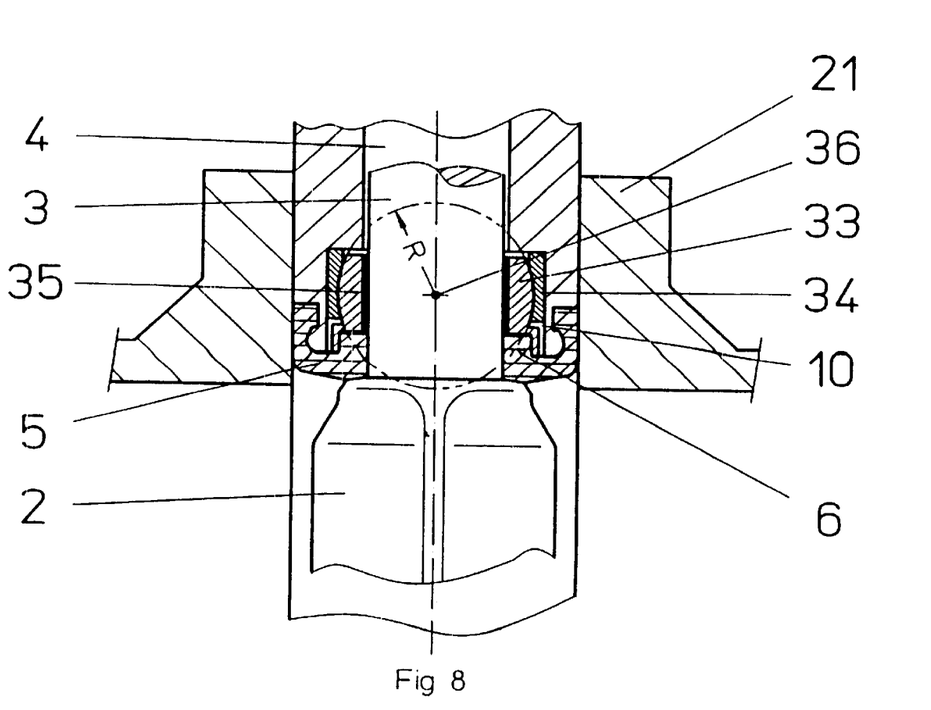
FIG. 8 shows a butterfly valve having an elastomer sleeve and a rotary bearing of the shaft for transmitting the radial and axial movements of the shaft to the collar of the sleeve.

FIG. 8 shows a butterfly valve with an elastomer sleeve 5 and a swivel bearing 33 of the shaft 3 as a clamping device for transmitting the radial and axial movements of the shaft 3 to the collar 6 of the sleeve 5. The swivel bearing 33 is accommodated in a recess 34 arranged in the neck 4. Under the effect of the differential pressure applied to the shutter 2, it may readily be imagined that the deformation of the shutter 2 and of the shaft 3 will cause rotation, through a guide bearing 35, of the shaft 3 and of the swivel bearing 3 in its recess 34 and that the distribution of the compression of the collar 6 of the sleeve 5 will not be affected either in its level or in its distribution, irrespective of the differential pressure of the fluid carried by the valve. The rocking of the bearing 33 takes place around the centre 36 of the sphere of radius R. The rocking movement is made up of a radial and an axial movement.

Figure 9:
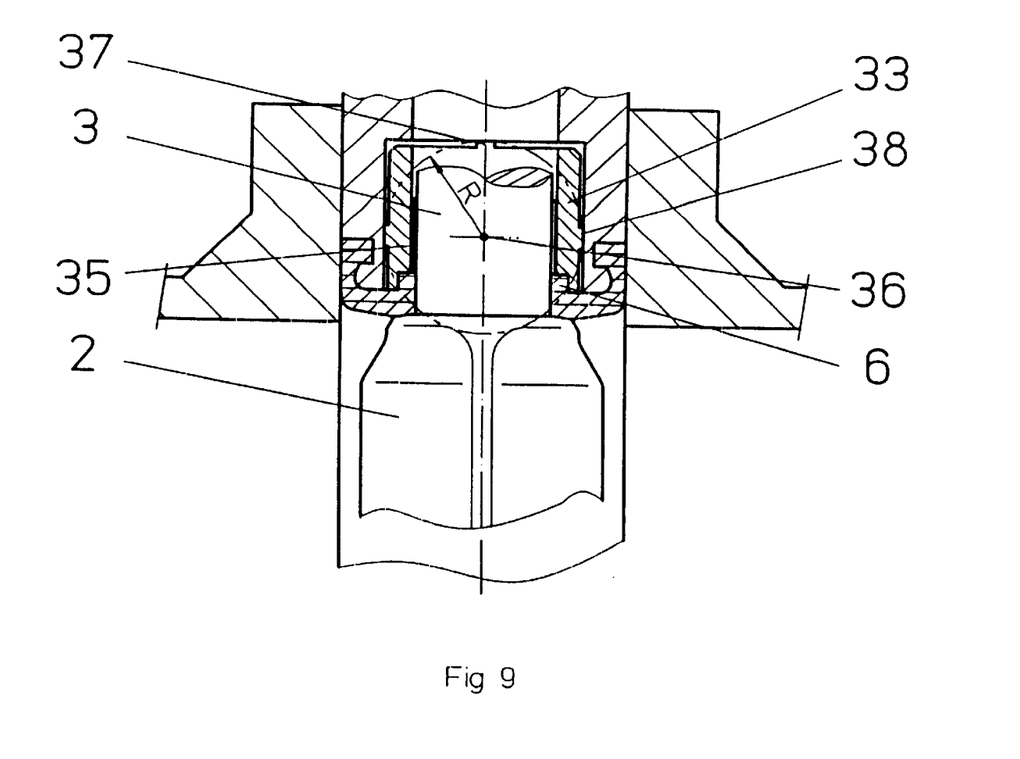
FIGS. 9 and 10 show a butterfly valve having a sleeve of elastomer and a partial pivot bearing.
Figure 10:
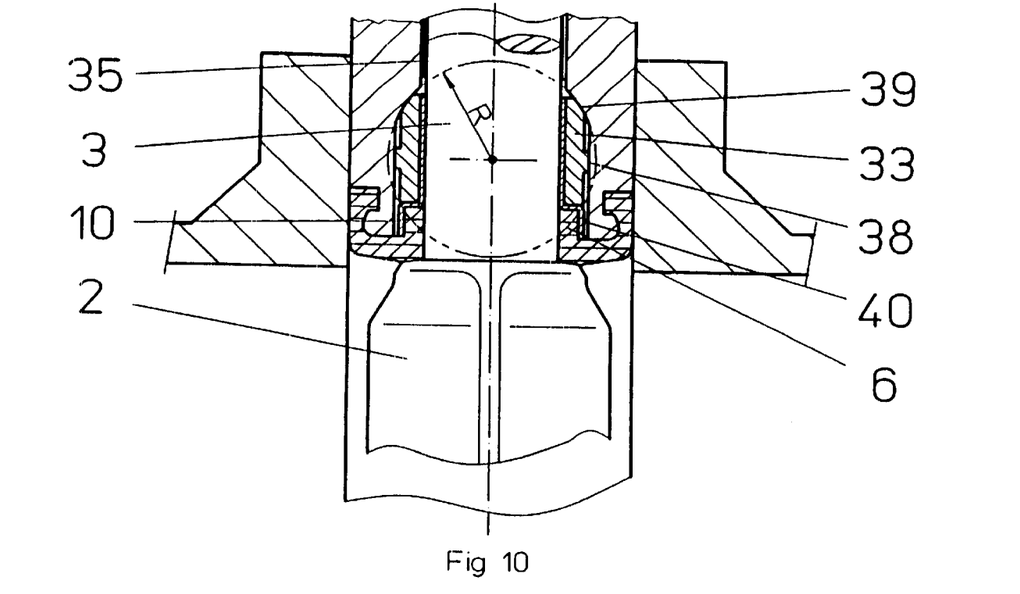

To simplify construction, FIGS. 9 and 10 show a butterfly valve with an elastomer sleeve 5 and a partial swivel bearing. The swivel bearing 33 bears only on relative small spherical strips 37, 38, 39. A spherical strip 38 is located in the centre of the swivel bearing 33, the other spherical strip 37;39 being opposite the bearing surface of the shutter 2. To guide the shaft 3, a bearing 35 is provided. A modified form of the swivel bearing 33 consists in the omission of the part 40.

Figure 11:
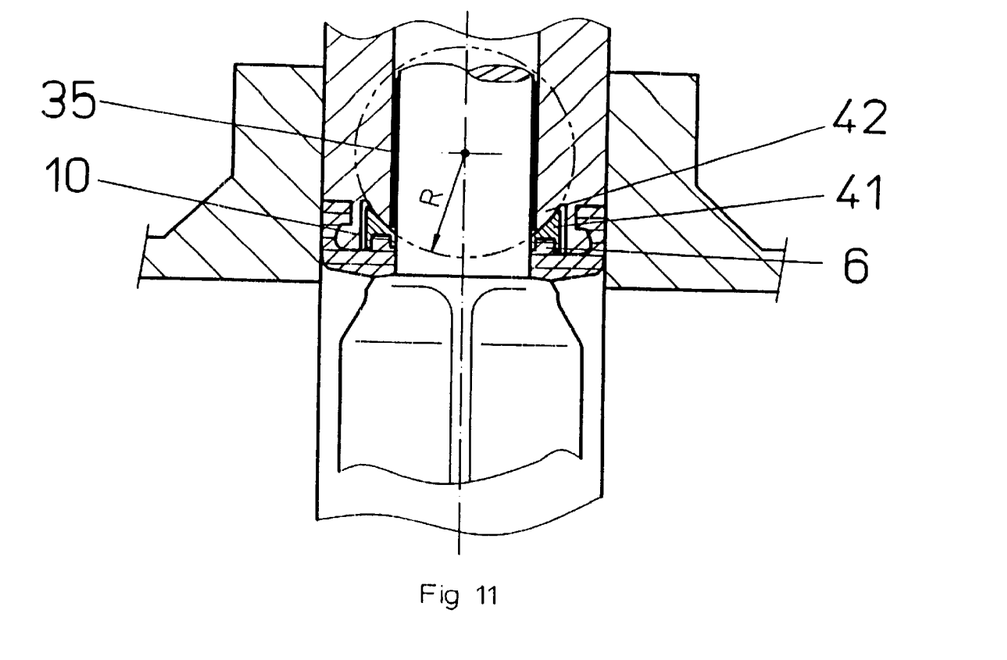
FIGS. 11 and 12 show a butterfly valve with an elastomer sleeve and the pivot bearing of the recess for the collar.
Figure 12:
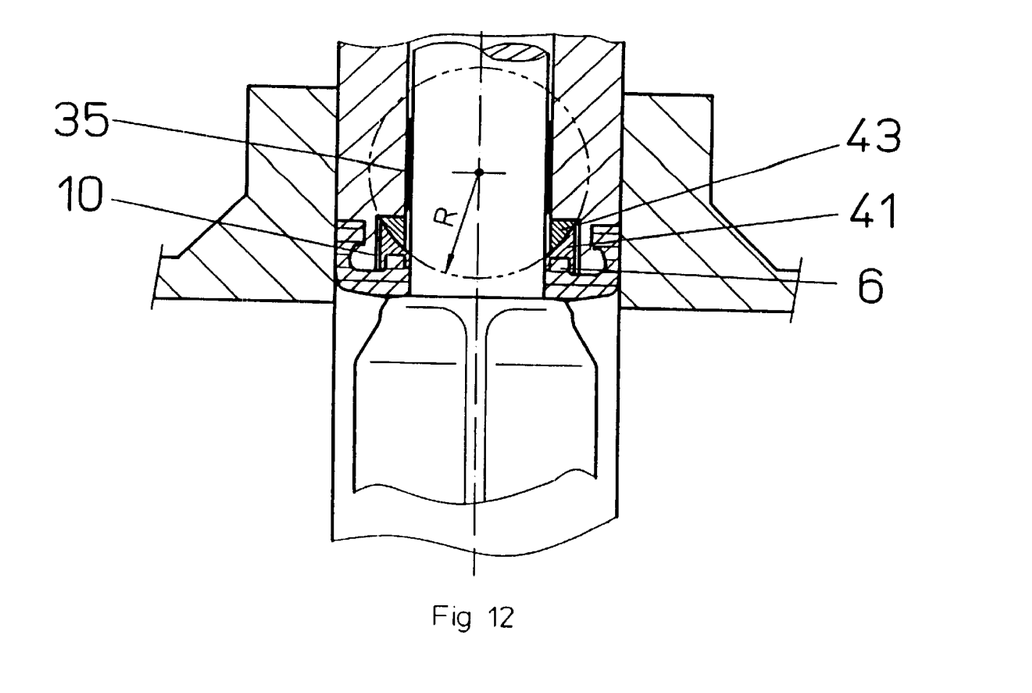

FIGS. 11 and 12 show a butterfly valve with an elastomer sleeve 5 and a swivel bearing of the recess 41 for the collar 6. Only the recess 41 for the collar 6 is in the form of a swivel bearing, the shaft is guided by the bearing 35. The counter-recess 42 itself for the bearing 41 is a spherical part 42 of the body or an independent part 43 floatingly mounted in the space 10.

INDUSTRIAL APPLICATION

It is obvious that the invention may also be used to provide a seal for shafts in cock valves or other valve devices.

We claim:

1. A valve device comprising:

a body;

a shutter manipulated by a shaft guided in a neck of the body and covered with a covering;

a sealing sleeve provided with a collar which extends over a certain length along the neck between the body and the shaft; and a clamping device positioned in a space in the body and around the collar, the clamping device comprising a resilient torus housed in a reaction ring and pressed against the collar by the reaction ring, wherein the reaction ring is floatingly mounted in the space with a clearance along the shaft and with axial and radial freedom of movement relative to the shaft, the clamping device being of such dimensions that it exerts a force on the collar and consequently the shaft on a clamping point and being mounted in the space whilst having radial freedom of movement within the space relative to the body, wherein the sleeve and the covering of the shutter are made of plastomer and a flexible cushion is placed between the body and the sleeve.

2. A valve device comprising:

a body;

a shutter manipulated by a shaft guided in a neck of the body;

a sealing sleeve provided with a collar which extends over a certain length along the neck between the body and the shaft; and a clamping device positioned in a space in the body and around the collar, the clamping device comprising a resilient torus housed in a reaction ring and pressed against the collar by the reaction ring, wherein the reaction ring is floatingly mounted in the space with a clearance along the shaft and with axial and radial freedom of movement relative to the shaft, the clamping device being of such dimensions that it exerts a force on the collar and consequently the shaft on a clamping point and being mounted in the space whilst having radial freedom of movement within the space relative to the body, wherein the reaction ring is provided with a conical part permitting prestressing of the resilient torus and of a cylindrical part acting as a seating for the resilient torus.

3. A valve device comprising:

a body;

a shutter manipulated by a shaft guided in a neck of the body;

a sealing sleeve provided with a collar which extends over a certain length along the neck between the body and the shaft; and a clamping device positioned in a space in the body and around the collar, the clamping device comprising a resilient torus housed in a reaction ring and pressed against the collar by the reaction ring, wherein the reaction ring is floatingly mounted in the space with a clearance along the shaft and with axial and radial freedom of movement relative to the shaft, the clamping device being of such dimensions that it exerts a force on the collar and consequently the shaft on a clamping point and being mounted in the space whilst having radial freedom of movement within the space relative to the body, wherein the clamping device additionally comprises a support ring on which the resilient torus rests axially, the radial dimensions being such that the support ring is also able to follow any radial movement of the shaft.

4. A valve device as defined in claim 1, wherein the covering of the shutter extends to cover the shaft along the collar, wherein the resiliant torus radially exerts a force on the collar to engage the collar with the covering of the shaft.

* * * * *